United States Patent
Henry et al.

(10) Patent No.: US 12,426,006 B2
(45) Date of Patent: Sep. 23, 2025

(54) SINGLE CLUSTER FORMATION TECHNIQUE FOR ULTRA-WIDEBAND (UWB) TIME DIFFERENCE OF ARRIVAL (TDOA)

(71) Applicant: Cisco Technology, Inc., San Jose, CA (US)

(72) Inventors: Jerome Henry, Pittsboro, NC (US); Pascal Thubert, Roquefort-les-Pins (FR)

(73) Assignee: Cisco Technology, Inc.

( * ) Notice: Subject to any disclaimer, the term of this patent is extended or adjusted under 35 U.S.C. 154(b) by 364 days.

(21) Appl. No.: 18/295,447

(22) Filed: Apr. 4, 2023

(65) Prior Publication Data

US 2024/0340845 A1    Oct. 10, 2024

(51) Int. Cl.
| | |
|---|---|
| H04W 64/00 | (2009.01) |
| H04L 41/16 | (2022.01) |
| H04W 4/02 | (2018.01) |

(52) U.S. Cl.
CPC .......... *H04W 64/003* (2013.01); *H04L 41/16* (2013.01); *H04W 4/023* (2013.01)

(58) Field of Classification Search
CPC ...... H04W 64/003; H04W 4/023; H04L 41/16
See application file for complete search history.

(56) References Cited

U.S. PATENT DOCUMENTS

| | | |
|---|---|---|
| 2011/0080853 A1 | 4/2011 | Thubert et al. |
| 2017/0195109 A1 | 7/2017 | Perz-Cruz et al. |
| 2018/0183701 A1 | 6/2018 | Qi |
| 2022/0104166 A1 | 3/2022 | Schober et al. |

FOREIGN PATENT DOCUMENTS

| | | | | |
|---|---|---|---|---|
| EP | 4492835 A1 | * | 1/2025 | .......... G01S 5/0268 |

OTHER PUBLICATIONS

International Search Report and Written Opinion for International Application No. PCT/US2024/022829, mailed Jul. 1, 2024, 17 Pages.
Kassab W., et al., "A-Z Survey of Internet of Things: Architectures, Protocols, Applications, Recent Advances, Future Directions and Recommendations", Journal of Network and Computer Applications, Academic Press, New York, NY, US, Apr. 18, 2020, vol. 163, 49 Pages, XP086159470, Paragraph [5.3.1"OriginalnetworklayerIoTprotocols"].
Shabbir G., et al., "Network Performance Enhancement of Multi-Sink Enabled Low Power Lossy Networks in SDN Based Internet of Things", International Journal of Parallel Programming, Plenum Press, New York, US, vol. 48, No. 2, Dec. 19, 2018, 32 Pages, XP037O7938, Paragraph [2.2"DODAGBuildingandMaintenanceModel"].
Martin, Mohammad A. "Wireless Sensor Networks-Technology and Protocols" North South University, Bangladesh; Janeza Trdine 9, 51000 Rijeka, Croatia, Sep. 2012; (319 pages).

* cited by examiner

*Primary Examiner* — Erika A Washington
(74) *Attorney, Agent, or Firm* — Merchant & Gould P.C.

(57) ABSTRACT

A single cluster formation technique for Ultra-Wideband (UWB) Time Difference of Arrival (TDoA) may be provided. A primary anchor may be elected from a plurality of anchors. Then a structure of a cluster formed by the plurality of anchors may be collected by the primary anchor. A Direction-Oriented Directed Acyclic Graph (DODAG) may be built for the cluster based on an uncontrolled time drift along the DODAG and weighted by a number of hops to the primary anchor.

20 Claims, 3 Drawing Sheets

SINGLE CLUSTER FORMATION TECHNIQUE FOR ULTRA-WIDEBAND (UWB) TIME DIFFERENCE OF ARRIVAL (TDOA)

TECHNICAL FIELD

The present disclosure relates generally to a single cluster formation technique for Ultra-Wideband (UWB) Time Difference of Arrival (TDoA).

BACKGROUND

Networking architectures have grown increasingly complex in communications environments, particularly mobile networking environments. In some instances, it is useful to determine a mobile device's location within a mobile networking environment. While the Institute of Electrical and Electronics Engineers (IEEE) 802.11 (e.g., Wi-Fi) or Bluetooth ranging techniques may be utilized in some cases to determine mobile device location, such technologies may provide limited location accuracy. Ultra-Wideband (UWB), as defined in IEEE 802.15.4a and 802.15.4z, may offer improved ranging accuracy over Wi-Fi and Bluetooth, however, utilizing a UWB radio or chip for a mobile device creates a battery cost for the device. Accordingly, there are significant challenges with using UWB ranging for mobile devices.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
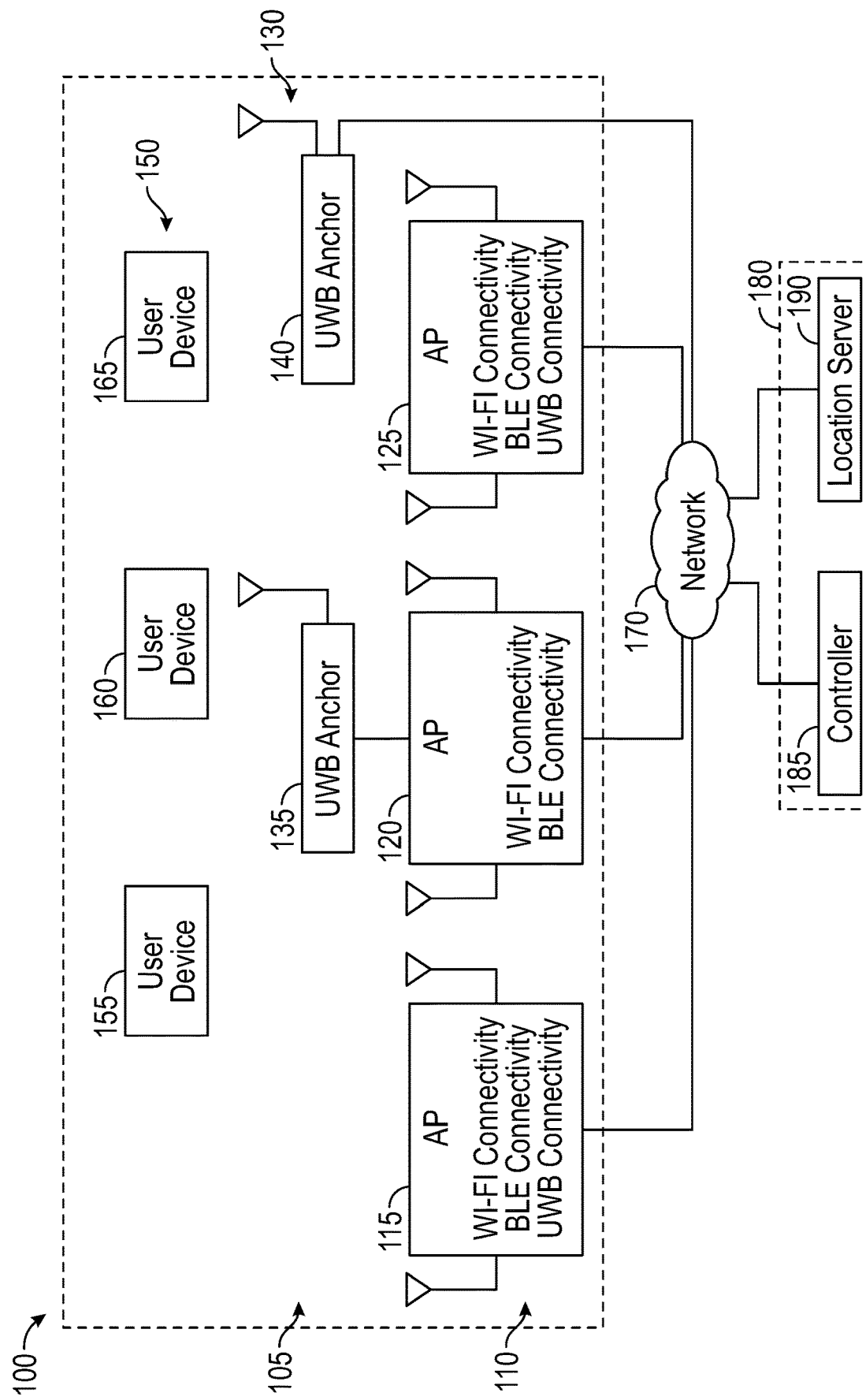
FIG. 1 is a block diagram of an operating environment for providing a single cluster formation technique for Ultra-Wideband (UWB) Time Difference of Arrival (TDoA)

A single cluster formation technique for Ultra-Wideband (UWB) Time Difference of Arrival (TDoA) may be provided. A primary anchor may be elected from a plurality of anchors. Then a structure of a cluster formed by the plurality of anchors may be collected by the primary anchor. A Direction-Oriented Directed Acyclic Graph (DODAG) may be built for the cluster based on an uncontrolled time drift along the DODAG and weighted by a number of hops to the primary anchor.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

Downlink (DL) Time Difference of Arrival (TDoA) processes may allow a Station (STA) (e.g., a user device) to listen to anchors exchanging timestamped messages, and may use TDoA to deduce its relative distance to each anchor. For the measurements to be usable, all anchors may form clusters, and synchronize their clocks with a primary anchor. The primary anchor may send timestamped trigger messages, the secondary anchors may synchronize their clocks to that of the primary anchor, and also respond to the primary anchor's messages (indicating the time of arrival of the primary anchor's message, and the time of departure of their response, all in the primary anchor's time).

One issue may be how this type of structure may scale in a large environment (e.g., a large warehouse or store, where the anchors may not all be in range of each other). One solution may be to form multiple clusters. However, inter-cluster clock synchronization remains problem. Another direction may be a single large cluster where anchors indicate in their messages a hop count value that reflects how far each anchor is from the primary, thus allowing farther anchors to react to secondary anchor's messages (their response to the primary) as proxy for the primary anchor's message (that they may not hear), and forming a Shortest-Path Tree (SPT)-style tree centered on the primary anchor. This structure may be inefficient for wireless networks, in particular because it may focus on the wrong metric (e.g., if a secondary anchor cannot hear the primary anchor, it may not matter if it is 2 or 3 hops away. Its clock accuracy, however, may matter.).

Embodiments of the disclosure may provide a process to dynamically build a graph of UWB anchors, allowing the primary anchor to naturally migrate toward the center of the floor, and allowing the cluster to form along the lines that best allow for message synchronization between anchors (thus may optimize the time consumption of the anchor-to-anchor messages and may minimize the risk of their collision). For example, embodiments of the disclosure may form and scale a single cluster in large environments. Once a cluster is created, it may then be shaped as a Direction-Oriented Directed Acyclic Graph. (DODAG) and used to propagate time (e.g., using Routing Protocol for Low-Power and Lossy Networks (RPL)). Embodiments of the disclosure may address the determination of the anchor relative distances (e.g., using a reactive routing protocol to probe how far an anchor is from another anchor) and the determination of which anchor is the barycenter. Once this component is solved, the DODAG may form around that anchor and distributes the time based on that anchor's clock. This way the network may remain synchronized with minimum drift (which may augment with the number of hops) and location activities may start.

FIG. 1 shows an operating environment 100 for providing a single cluster formation technique for UWB TDoA. As shown in FIG. 1, operating environment 100 may comprise a venue 105. Venue 105 may include a plurality of Access Points (APs) 110, for example, a first AP 115, a second AP 120, and a third AP 125. Venue 105 may further comprise a plurality of UWB anchors 130, for example, a first UWB anchor 135 and a second UWB anchor 140. Venue 105 may further comprise a plurality of user devices 150, for example, a first user device 155, a second user device 160, and a third user device 165. Operating environment 100 may further include a network 170 and a control device 180. Control device 180 may include a controller 185 and a location server 190. While operating environment 100 shows two anchors in plurality of UWB anchors 130, operating environment 100 may comprise any number of anchors. For example, venue 105 may comprise a large warehouse or store with a large number of anchors where the large number of anchors may not all be in range of each other.

Venue 105 may support any density of plurality of user devices 150, and may include any indoor or outdoor area, such as a home, school, campus, office building, conference center, stadium, or other venue or location or portion thereof. Venue 105 may include a restricted area or an admission controlled area. Each of plurality of APs 110 may be positioned at known locations in venue 105 and may facilitate a connection between one or more of plurality of user devices 150 and network 170.

Plurality of APs 110, for example, may communicate with plurality of user devices 150 through Wi-Fi Wireless Local Area Network (WLAN), Bluetooth Low Energy (BLE), or UWB. For example, plurality of APs 110 may include a Wi-Fi chipset for providing Wi-Fi connectivity, a BLE chipset for providing BLE connectivity, and a UWB chipset for providing UWB connectivity. First AP 115 and third AP 125 may include built-in/integrated Wi-Fi connectivity, BLE connectivity, and UWB connectivity. Second AP 120 may include built-in/integrated Wi-Fi connectivity and BLE connectivity but not UWB connectivity. However, second AP 120 may achieve UWB connectivity via first UWB anchor 135 that may be connected to second AP 120.

Each of plurality of UWB anchors 130 may also be positioned at known locations in venue 105, and may receive, send, and process UWB transmissions. Each of plurality of UWB anchors 130 may include other communication capabilities, such as BLE wireless communication capabilities or wired communication capabilities, for example, via a connection to network 170 over IEEE 802.11, Ethernet, or another connection mechanism. First UWB anchor 135 may also be referred to as a peripheral UWB anchor as it may be connected to second AP 120. Second UWB anchor 140 may also be referred to as a standalone UWB anchor. An anchor, for example, may refer to any device configured to detect UWB transmissions from plurality of user devices 150. Therefore, each of first AP 115, third AP 125, and plurality of UWB anchors 130 may be referred to as an anchor.

Plurality of user devices 150 may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device.

Each of plurality of user devices 150 may communicate with one or more of plurality of APs 110 and one or more of plurality of UWB anchors 130. For example, each of plurality of user devices 150 may include Wi-Fi WLAN connectivity for communicating over Wi-Fi WLAN, BLE connectivity for communicating over BLE, and UWB connectivity for communicating over UWB. Plurality of user devices 150 may include a Wi-Fi chipset for providing Wi-Fi connectivity, a BLE chipset for providing BLE connectivity, and a UWB chipset for providing UWB connectivity. Each of plurality of user devices 150 may also include a fine ranging enabled application. The fine ranging enabled application, in an example, may manage UWB connectivity of each of plurality of user devices 150.

Plurality of APs 110, plurality of UWB anchors 130, and plurality of user devices 150 may communicate with control device 180 via network 170. Network 170 may include any communications medium for transmitting information between two or more computing devices. For example, network 170 may include a LAN, a Wide Area Network (WAN), a Virtual Private Network (VPN), Intranet, Internet, hardwire connections, modem connections, wireless connections, or combinations of one or more these items.

Controller 185 may manage operations of plurality of APs 110. For example, controller 185 may facilitate communications involving plurality of user devices 150 through plurality of APs 110. Controller 185 and location server 190 may be separate and physically distinct entities Location server 190 may manage location-related transmissions involving plurality of APs 110, plurality of UWB anchors 130, and plurality of user devices 150. For example, location server 190 may cooperate with plurality of APs 110, plurality of UWB anchors 130, and plurality of user devices 150 to initiate and complete device ranging procedures at venue 105 that provide location measurements to location solutions. Location server 190 may perform location computations, that is, process time, distance, angle, signal strength or other information from one or more of plurality of APs 110, plurality of UWB anchors 130 and plurality of user devices 150. Location server 190 may determine or track a position of a particular one of plurality of user devices 150 on venue 105 and may provide to some other entity seeking that location information.

The elements described above of operating environment 100 (e.g., plurality of APs 110, plurality of UWB anchors 130, plurality of user devices 150, control device 180, controller 185, and location server 190) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
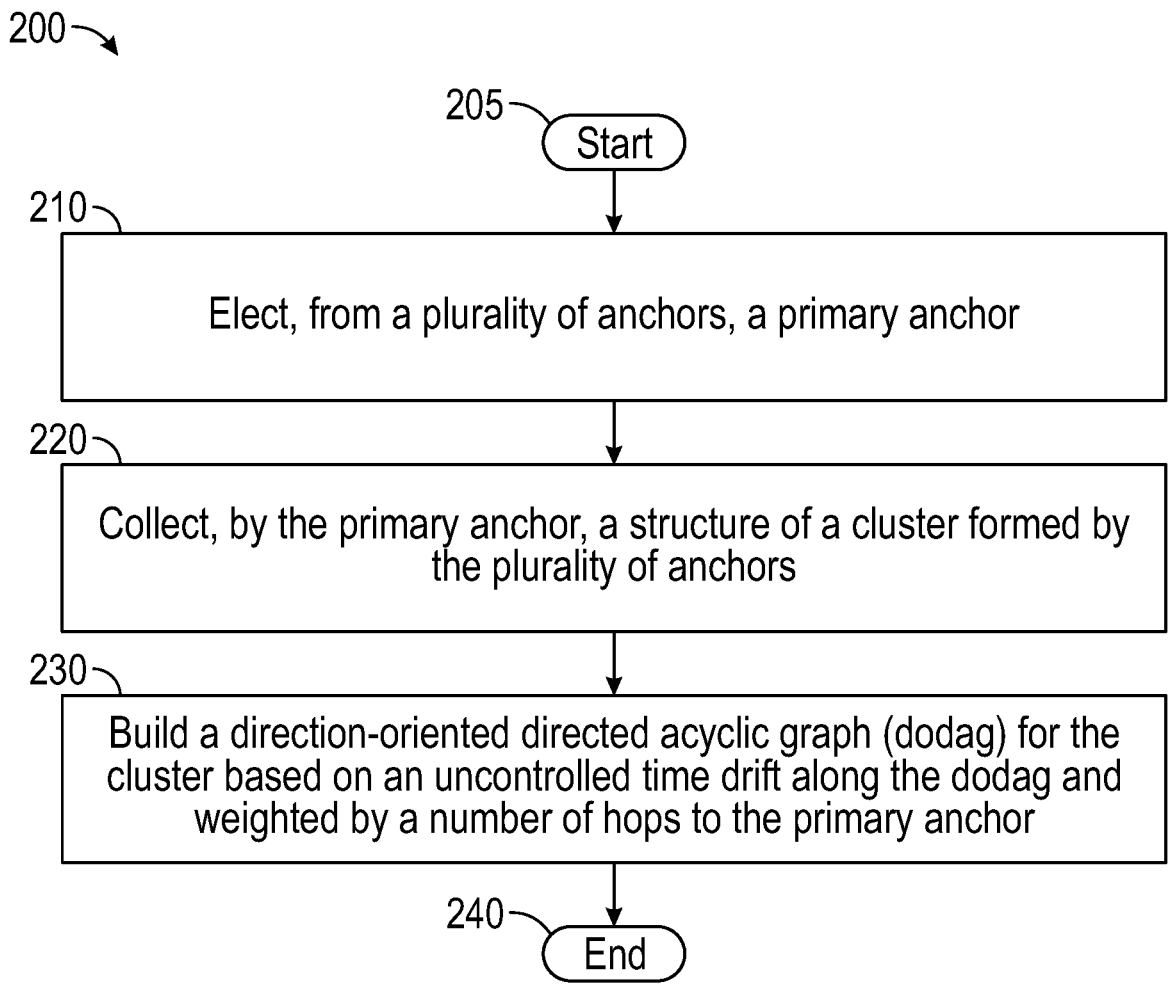
FIG. 2 is a flow chart of a method for providing a single cluster formation technique for UWB TDoA.

FIG. 2 is a flow chart setting forth the general stages involved in a method 200 consistent with embodiments of the disclosure for providing a single cluster formation technique for UWB TDoA. Method 200 may be implemented using a computing device 300 as described in more detail below with respect to FIG. 3. Ways to implement the stages of method 200 will be described in greater detail below.

Method 200 may begin at starting block 205 and proceed to stage 210 where computing device 300 may elect, from a plurality of anchors, a primary anchor. For example, the position of the Primary Anchor (PA) may be important, as it may drive the number of hops to the farthest secondary anchor. In one embodiment, the position of the PA may be determined by an administrator (e.g., the center of the floor). In another embodiment, the position of the PA may be determined through an election process. In this embodiment, anchors may send discovery messages. The PA may not be statically defined. Each anchor may be an initial PA candidate and may send discovery and PA candidacy messages. Other anchors may receive these messages, and start preferring PA candidates based on: i) configurable criteria (e.g. Radio Frequency (RF)-based elements where PA candidate declared number of neighbors); ii) arbitrary elements (e.g., PA candidate Media Access Control (MAC) address value); or iii) an observed drift as described below. In one embodiment the discovery may be relayed via AODV Ad-hoc On-demand Distance Vector (AODV) and a cost may be aggregated as a distance. Each PA candidate may therefore measure how far it is from each other anchor. The PA candidate that has the lowest distance to the farthest other anchor may be the most central (or the smallest sum of all distances) and may be the graph initial barycenter and may be declared the PA.

From stage 210, where computing device 300 elects, from the plurality of anchors, the primary anchor, method 200 may advance to stage 220 where computing device 300 may collect a structure of a cluster formed by the plurality of anchors. For example, each anchor may respond to the PA, or to a Secondary Anchor (SA) when the PA is out of range or below usable signal level. The PA may collect the structure of the graph (i.e., which children, through which parent, and thus how many hops).

The PA may be configured with a depth asymmetry value, allowing some of its children (i.e., first hop anchors) reporting the largest depth to have a deeper children line than others. For example, this may be done using a simplified hop count as a metric. For example, an asymmetry value of 1 may allow many children to report a children depth of (1-4), some children to report a depth of 5, and another child a depth of 6, but may not allow a child to report a depth of 6 while no other child reports a depth larger than 4.

If the cluster displays an asymmetry value larger than the one configured, the PA may attempt to pass the PA role to an SA positioned closer to the graph barycenter. The PA sends candidacy messages to these SAs, among which an election process occurs as described above. The process may be repeated until the depth asymmetry requirement is met.

Once computing device 300 collects the structure of the cluster formed by the plurality of anchors in stage 220, method 200 may continue to stage 230 where computing device 300 may build a Direction-Oriented Directed Acyclic Graph (DODAG) for the cluster based on an uncontrolled time drift along the DODAG and weighted by a number of hops to the primary anchor. For example, the DODAG may be built using RPL. However, embodiments of the disclosure may measure the uncontrolled time drift (or time drift stochasticity) along the graph.

In this mode, for example, a PA (or a relay SA) may send a synchronization message at time t1, with a timestamp. An SA may receive the message at time t2, and aligns its clock to that of the sender. After an interval, the PA (or relay SA) may send the next synchronization message at time t3, received by the SA at time t4. As the sender and receiver clocks may not be perfectly synchronized, a drift may be observed expressed as $Tau_1=(t4-t2)-(t3-t1)$. The receiver may then estimate the time at which the next sync message may be received.

As time drift may be a difference of clock, it may not be determined from a single pair which side has drifted. However, over several intervals, the SA may determine the linearity of the drift, and may select as the best parent the sender which drift is most linear (thus most predictable), weighted by the parent's number of hops to the PA. This metric may allow a child to best predict the time of the next sync message and thus best align its clock to that of its parent. This metric may also allow a child to select a parent that may have a longer hop count to the PA, but a better clock drift predictability. This metric may also allow an anchor with a faulty clock to remain single (i.e., not become parent of any other anchor, unless no other anchor is in range).

In another embodiment, this metric may also be used to elect the PA as described above. In this mode, each anchor receiving PA candidacy messages may elect the sending anchor which drift is the easiest to predict.

As the graph may be stable, the anchors relay the messages from the elected PA. However, the PA (or a parent) may get disconnected and disappear from the graph. In one embodiment, each anchor may also build a second instance, selecting a different parent (and thus at the PA level, electing as the PA the second most linear sender). This second instance may allow an anchor to find an alternate parent in the same graph, or breach a second PA through an alternate graph. Once computing device 300 builds the DODAG for the cluster based on an uncontrolled time drift along the DODAG and weighted by a number of hops to the primary anchor in stage 230, method 200 may then end at stage 240.

Figure 3:
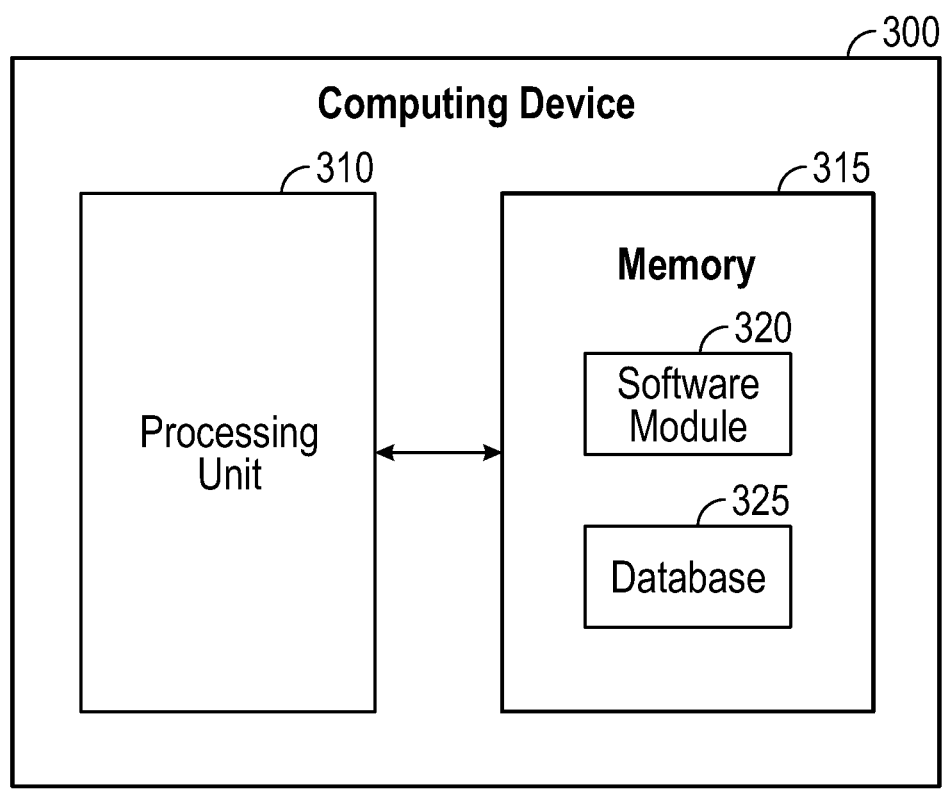
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for receiving location information from plurality of user devices 150 in UWB as described above with respect to FIG. 2 and processes for providing location tracking information in UWB as described above with respect to FIG. 3. Computing device 300, for example, may provide an operating environment for plurality of APs 110, plurality of UWB anchors 130, plurality of user devices 150, control device 180, controller 185, or location server 190. Plurality of APs 110, plurality of UWB anchors 130, plurality of user devices 150, control device 180, controller 185, and location server 190 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   electing, from a plurality of anchors, a primary anchor;
   collecting, by the primary anchor, a structure of a cluster formed by the plurality of anchors; and
   building a Direction-Oriented Directed Acyclic Graph (DODAG) for the cluster based on an uncontrolled time drift along the DODAG and weighted by a number of hops to the primary anchor.

2. The method of claim 1, wherein electing the primary anchor comprises determining that the primary anchor has a greatest number of neighbors as compared to others of the plurality of anchors.

3. The method of claim 1, wherein electing the primary anchor comprises determining that the primary anchor, compared to others of the plurality of anchors, has a lowest distance to a farthest other anchor of the plurality of anchors.

4. The method of claim 1, wherein collecting the structure of the cluster formed by the plurality of anchors comprises receiving responses to the primary anchor from the plurality of anchors.

5. The method of claim 1, further comprising prior to building the DODAG and when a predetermined depth asymmetry value has been exceeded re-electing, from the plurality of anchors, a new primary anchor that is different from the primary anchor.

6. The method of claim 5, further comprising recollecting, by the new primary anchor, the structure of the cluster formed by the plurality of anchors.

7. The method of claim 1, wherein building the DODAG comprises using Routing Protocol for Low-Power and Lossy Networks (RPL).

8. A system comprising:
   a memory storage; and
   a processing unit coupled to the memory storage, wherein the processing unit is operative to:
   elect, from a plurality of anchors, a primary anchor;
   collect, by the primary anchor, a structure of a cluster formed by the plurality of anchors; and
   build a Direction-Oriented Directed Acyclic Graph (DODAG) for the cluster based on an uncontrolled time drift along the DODAG and weighted by a number of hops to the primary anchor.

9. The system of claim 8, wherein the processing unit being operative to elect the primary anchor comprises the processing unit being operative to determine that the primary anchor has a greatest number of neighbors as compared to others of the plurality of anchors.

10. The system of claim 8, wherein the processing unit being operative to elect the primary anchor comprises the processing unit being operative to determine that the primary anchor, compared to others of the plurality of anchors, has a lowest distance to a farthest other anchor of the plurality of anchors.

11. The system of claim 8, wherein the processing unit being operative to collect the structure of the cluster formed by the plurality of anchors comprises the processing unit being operative to receive responses to the primary anchor from the plurality of anchors.

12. The system of claim 8, wherein the processing unit is further operative to, prior to building the DODAG and when a predetermined depth asymmetry value has been exceeded, re-elect, from the plurality of anchors, a new primary anchor that is different from the primary anchor.

13. The system of claim 12, wherein the processing unit is further operative to recollect, by the new primary anchor, the structure of the cluster formed by the plurality of anchors.

14. A non-transitory computer-readable medium that stores a set of instructions which when executed perform a method executed by the set of instructions comprising:
   electing, from a plurality of anchors, a primary anchor;
   collecting, by the primary anchor, a structure of a cluster formed by the plurality of anchors; and
   building a Direction-Oriented Directed Acyclic Graph (DODAG) for the cluster based on an uncontrolled time drift along the DODAG and weighted by a number of hops to the primary anchor.

15. The non-transitory computer-readable medium of claim 14, wherein electing the primary anchor comprises determining that the primary anchor has a greatest number of neighbors as compared to others of the plurality of anchors.

16. The non-transitory computer-readable medium of claim 14, wherein electing the primary anchor comprises determining that the primary anchor, compared to others of the plurality of anchors, has a lowest distance to a farthest other anchor of the plurality of anchors.

17. The non-transitory computer-readable medium of claim 14, wherein collecting the structure of the cluster formed by the plurality of anchors comprises receiving responses to the primary anchor from the plurality of anchors.

18. The non-transitory computer-readable medium of claim 14, further comprising prior to building the DODAG and when a predetermined depth asymmetry value has been exceeded re-electing, from the plurality of anchors, a new primary anchor that is different from the primary anchor.

19. The non-transitory computer-readable medium of claim 18, further comprising recollecting, by the new primary anchor, the structure of the cluster formed by the plurality of anchors.

20. The non-transitory computer-readable medium of claim 14, wherein building the DODAG comprises using Routing Protocol for Low-Power and Lossy Networks (RPL).

* * * * *